United States Patent [19]

Crawford et al.

[11] 3,740,793
[45] June 26, 1973

[54] FEATHER PICKER HAVING SECTIONAL FINGER SUPPORTS

[75] Inventors: Robert D. Crawford; Ralph D. Johnson, both of Kansas City, Mo.

[73] Assignee: Gordon Johnson Company, Kansas City, Mo.

[22] Filed: July 26, 1971

[21] Appl. No.: 166,019

[52] U.S. Cl. ................................................. 17/11.1
[51] Int. Cl. ............................................ A22c 21/02
[58] Field of Search ..................................... 17/11.1

[56] References Cited
UNITED STATES PATENTS
3,538,540  11/1970  Hathorn .............................. 17/11.1
2,743,477  5/1956   Barker et al. ....................... 17/11.1

Primary Examiner—Lucie H. Laudenslager
Attorney—Schmidt, Johnson, Hovey & Williams

[57] ABSTRACT

A feather picker having a plurality of fingers mounted on a sectionalized support for removing the feathers from poultry carcasses as they are suspended from a conveyor line. The support comprises a pair of sections in spaced, end-to-end relationship having yieldable structure interconnecting the ends thereof permitting limited relative movement of the sections as they are driven by eccentrics in unison through a predetermined orbital path. The sectionalizing of the finger support with relative movement between the sections serves to minimize as well as make it easier to compensate for the inertial stresses imposed upon the support as it constantly changes direction while moving through its orbital path. Furthermore, the requirement for a perfectly timed drive mechanism to maintain the eccentrics in perfect synchronization is thus eliminated.

11 Claims, 4 Drawing Figures

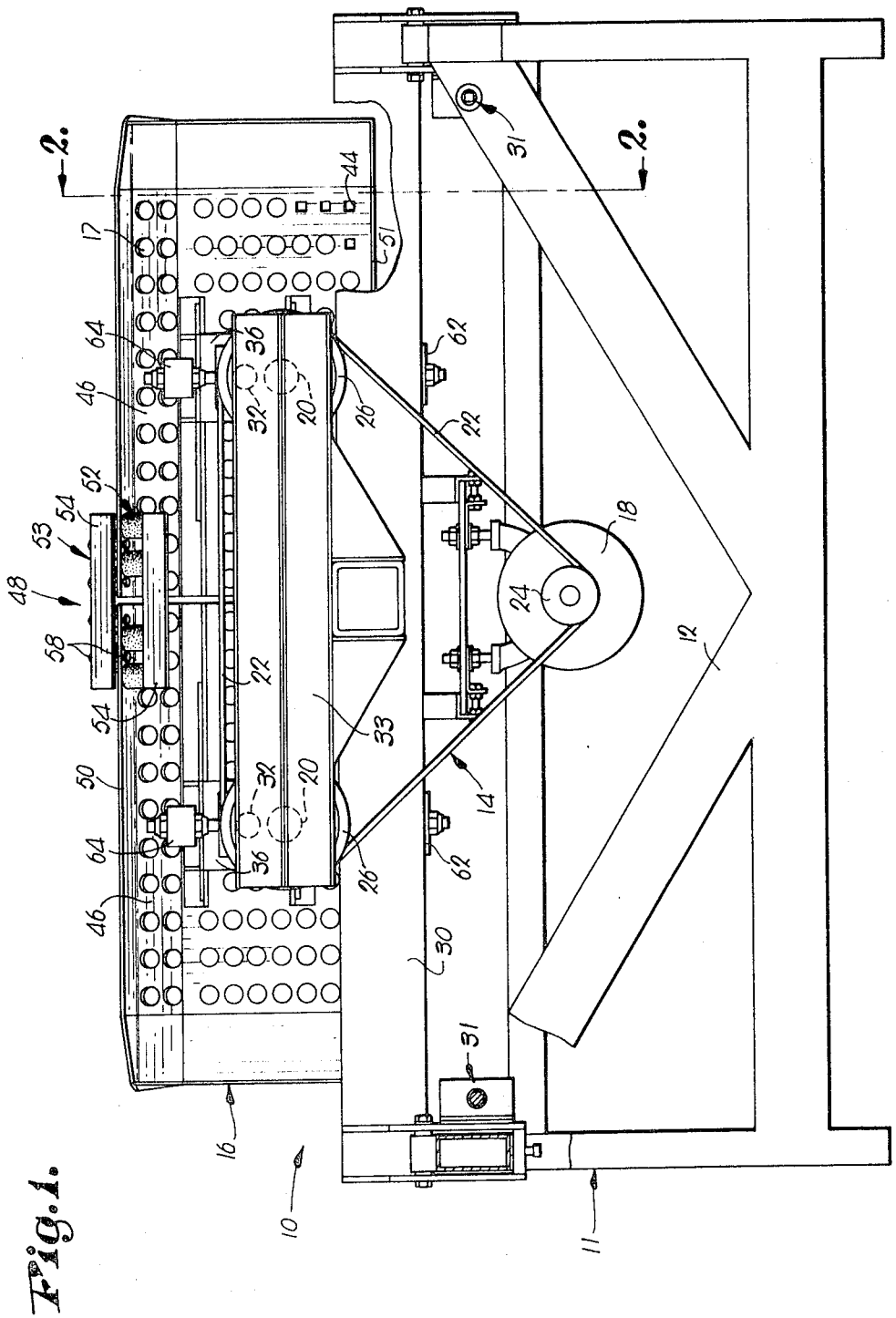

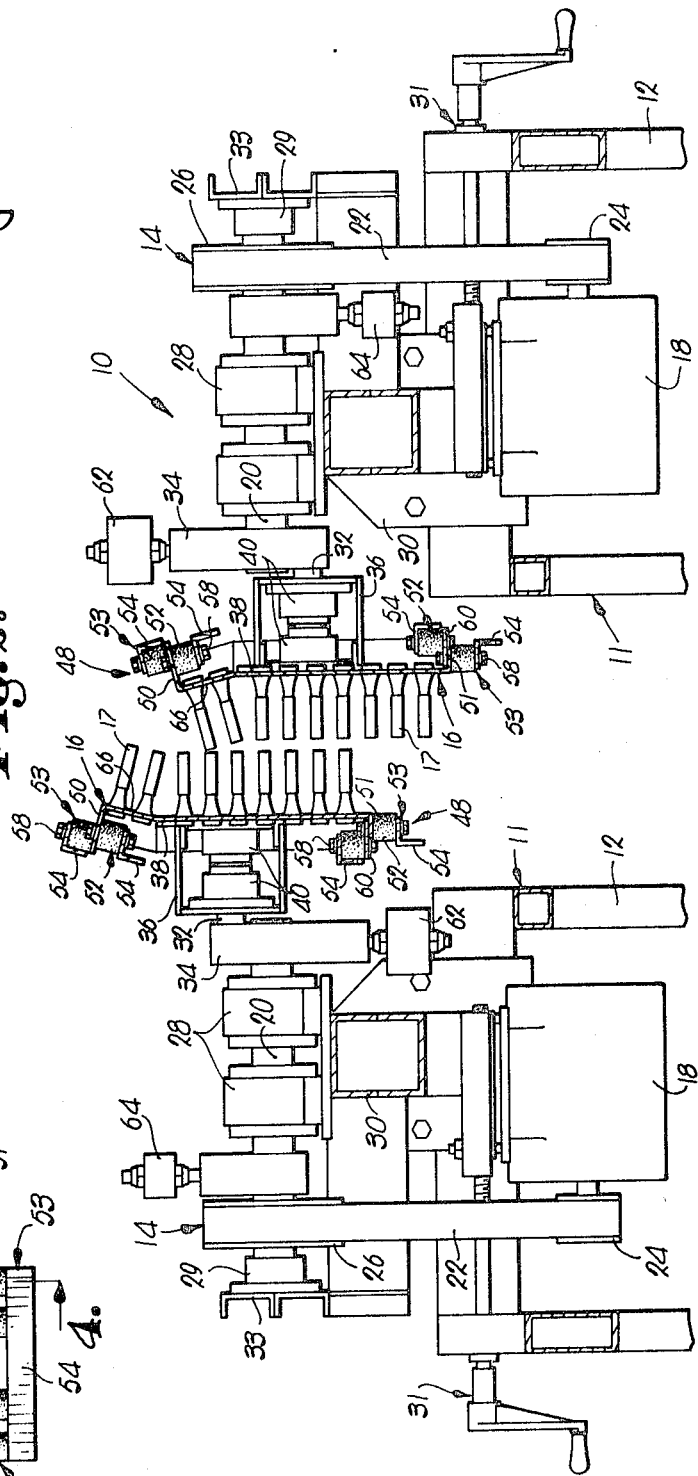

FEATHER PICKER HAVING SECTIONAL FINGER SUPPORTS

This invention relates to an improvement for an apparatus to remove feathers from poultry as disclosed in U.S. Pat. No. 3,538,540, owned by the assignee hereof, dated Nov. 10, 1970, in the name of J. L. Hathorn, and entitled "Poultry Defeathering Apparatus." The apparatus of the patent is designed to mechanically remove the feathers from the carcasses of poultry by an orbital scrubbing action as they are moved along a conveyor line. The action is obtained by causing a feather picking finger support to orbit in an elliptical path of travel which requires that the entire mass of the support continually change direction, thus creating considerable inertial stresses within the support and its attendant drive and base structure. Whereas the disclosure of the above-mentioned patent provides a significant improvement in the art of removing feathers from poultry, the instant invention is important in that certain structural requirements of the patented machine are eliminated. More specifically, the improvement herein disclosed relates to the sectionalizing of the finger-mounting supports to divide the mass thereof and thereby minimize the magnitude of the inertial stresses generated because the entire mass of the support need not change direction simultaneously at all times as it moves in its orbital path. This invention, furthermore, permits a limited out-of-phase condition between the series of eccentrics which drive the supports in their orbital path, thereby eliminating the requirement for perfect synchronization of the eccentrics.

It is, therefore, an important object of our present invention to improve upon the poultry defeathering apparatus disclosed in U.S. Pat. No. 3,538,540.

It is another important object of this invention to reduce the magnitude of the inertial stresses imposed upon the finger supports at any one point in time as it is driven and moved about its predetermined orbital path.

It is a further important object of our invention to provide a feather picker that is able to tolerate a limited out-of-phase, angular relationship between the series of eccentrics which move the finger support in its orbital path, thus making it unnecessary to maintain perfect angular synchronization therebetween.

A still further object of the invention is to provide a feather picker which can be constructed of relatively lightweight materials, thereby reducing the weight of the mass required to constantly change direction, and thus permit the use of standard, readily available materials and components rather than specialty items needed to accommodate the forces created by a heavier mass.

In the drawings:

FIG. 1 is a side elevational view of a feather picker having sectionalized finger supports interconnected with yieldable structure in accordance with the present invention;

FIG. 2 is a cross-sectional view taken along line 2—2 of FIG. 1;

FIG. 3 is a fragmentary, detailed, elevational view illustrating the relationship of the yieldable structure to the spaced-apart sections of one of the finger supports; and FIG. 4 is an enlarged, fragmentary cross-sectional view taken along line 4—4 of FIG. 3.

Referring initially to FIG. 1, the numeral 10 broadly denotes an apparatus designed to be installed beneath an overhead conveyor line suspending poultry carcasses from which feathers are to be removed as in the above-identified patent. Inasmuch as apparatus 10 consists of a pair of identical units 11 placed in face-to-face relationship on opposite sides of the conveyor, the description will be confined to one of the units 11 positioned on one side of the conveyor, it being understood that the opposite unit 11 is constructed and operates in like manner.

Unit 11 includes an elongated base 12 provided with a shiftable drive mechanism 14 having a finger support 16 operably coupled thereto, there being a plurality of feather picking fingers 17 extending laterally from the inner face of support 16. Elongated support 16 has its longitudinal axis parallel with the direction of travel of the conveyor line.

Drive mechanism 14 consists of an electric motor 18 coupled to a pair of spaced-apart shafts 20 by means of a notched belt 22 and cooperating notched pulleys 24 and 26. Shafts 20 are carried transversely of base 12 by bearings 28 which are, in turn, supported by a frame 30 from which motor 18 is also suspended. Frame 30 is shiftable laterally on base 12 by adjusting means 31 and includes a beam 33 carrying bearings 29 for the ends of shafts 20 proximal to pulleys 26. Mechanism 14 further includes an eccentric 32 coupled to each shaft 20 by means of arms 34. A pair of spaced-apart, U-shaped brackets 36 affixed to the outer face 38 of finger support 16 are journaled to eccentrics 32 by bearings 40.

Elongated support 16 has a plurality of apertures 44 to receive and hold fingers 17 and is divided into a pair of spaced, end-to-end, rectangular, plate-like sections 46, each of which is secured to one of the brackets 36. A yieldable structure 48 interconnects sections 46 at their upper and lowermost edges, which edges terminate in laterally extending flanges or projections 50 and 51. Support 16 is so positioned by brackets 36 that eccentrics 32 are located intermediate the ends of each of their respective sections 46 and are spaced in opposite directions from structure 48.

Each of the upper and lower assemblies 53 of the structure 48 includes a number of cylindrically-shaped elements 52 attached to each section 46 respectively and to a pair of rigid connectors 54 joining the elements 52. The elements 52 are provided with relatively rigid mounting means 56 in the nature of cups secured to their corresponding sections 46 and connectors 54 by studs 58 threaded into nuts 55 rigid to cups 56. Each element 52 has a resilient body 57 of rubber or the like having the cups 56 molded thereinto. An extension 60 for the lower assembly 53 is provided on flange 51 to space those elements 52 away from face 38 which would otherwise interfere with the insertion of proximal fingers 17. Thus, each support 16 is provided with 16 elements 52 that are in turn joined by four connectors 54.

Keeping in mind that considerable inertial stress is created within each finger support 16 due to its mass having to rapidly and constantly change directions as it is moved in its orbital path by eccentrics 32, in order to minimize such stress and to thereby permit lighter construction of the entire apparatus, support 16 is sectionalized and the interconnecting yieldable structures 48 provided so that as each eccentric 32 actuates its respective section 46, the sections 46 may independently move relative to each other in all planes and yet operate substantially in unison. Further, the sectionalizing of supports 16 eliminates the need for maintaining eccentrics 32 in exact angular phase. The yieldability of structures 48 compensates for the variation in center distances between the eccentrics 32 when they are not perfectly synchronized. As in the above-mentioned patent, counterweights 62 and 64, provided as a part of mechanism 14 to dampen the vibrations and counteract the out-of-balance situation created by the eccentrics 32 and the corresponding offset relationship of the orbiting mass with respect to shafts 20, are now capable, with the present invention, of performing their intended functions in an improved manner.

Structures 48, by virtue of elements 52, also compensate for the variations in distance between each pair of sections 46 while maintaining the general relative relationship between each pair of sections 46 because of rigid connectors 54. Elements 52 readily permit relative movement of the sections 46 in a multitude of directions during orbiting. The stress and vibration dampening qualities of elements 52 further permit a reduction in the size and load-bearing requirements of bearings 28 and 40, brackets 36, shafts 20, and eccentrics 32.

Therefore, both vibration and shock problems have been eliminated. The difficulty of synchronization of the eccentrics, the adverse effect of inertia and the strains incident to rapid reversal of direction at the ends of the strokes are of no further concern. With the improvements above described, the machine operates smoothly at all times with no noticeable vibration or undue stress and strain on any of its components.

Having thus described the invention, what is claimed as new and desired to be secured by Letters Patent is:

1. In a feather picker,
 a finger support having a plurality of feather-picking fingers;
 mechanism for driving the support through a predetermined path of travel,
 said support having a pair of sections; and
 structure causing said sections to travel in unison through said path,
 said structure permitting limited relative movement of said sections as the same are driven by said mechanism,
 said structure operably interconnecting the sections and including a resilient element attached to each section respectively and a connector joining the elements.

2. A feather picker as claimed in claim 1 wherein said sections are in spaced, end-to-end relationship and said structure interconnects the sections at said ends thereof.

3. A feather picker as claimed in claim 1 wherein said path is orbital.

4. A feather picker as claimed in claim 3 wherein said mechanism includes an eccentric for each section respectively and power means coupled with the eccentrics for actuating the latter.

5. A feather picker as claimed in claim 1 wherein each element is provided with relatively rigid mounting means secured to its corresponding section and to the connector.

6. A feather picker as claimed in claim 5 wherein diametrically opposed studs secure the mounting means to the sections and to the connector.

7. A feather picker as claimed in claim 1 wherein said path is orbital and wherein the elements permit said relative movement in a multitude of directions during orbiting of the sections.

8. A feather picker as claimed in claim 7 wherein said sections have lateral projections to which the elements are attached and said connector is relatively rigid.

9. A feather picker as claimed in claim 8 wherein said sections are in spaced, end-to-end relationship and said structure interconnects the sections at said ends thereof.

10. A feather picker as claimed in claim 9 wherein said mechanism includes an eccentric for each section respectively and power means coupled with the eccentrics for actuating the latter.

11. A feather picker as claimed in claim 10 wherein the eccentrics are intermediate the ends of the sections and spaced in opposite directions from said structure.

* * * * *